US011973286B2

(12) United States Patent
Hu

(10) Patent No.: US 11,973,286 B2
(45) Date of Patent: Apr. 30, 2024

(54) ELECTRICAL CONNECTOR AND MANUFACTURING METHOD THEREOF

(71) Applicant: Amphenol Commercial Products (Chengdu) Co., Ltd., Sichuan (CN)

(72) Inventor: Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 10 days.

(21) Appl. No.: 17/331,414

(22) Filed: May 26, 2021

(65) Prior Publication Data

US 2021/0376508 A1 Dec. 2, 2021

(30) Foreign Application Priority Data

Jun. 1, 2020 (CN) ......................... 202010485530.5
Jun. 1, 2020 (CN) ......................... 202020977155.1

(51) Int. Cl.

*H01R 12/73* (2011.01)
*H01R 13/24* (2006.01)
*H01R 13/42* (2006.01)

(52) U.S. Cl.

CPC ............. *H01R 12/73* (2013.01); *H01R 13/24* (2013.01); *H01R 13/42* (2013.01)

(58) Field of Classification Search

CPC .. H01R 23/7068; H01R 23/725; H01R 12/73; H01R 13/42; H01R 13/24

(Continued)

(56) References Cited

U.S. PATENT DOCUMENTS 3,573,706 A 4/1971 Haberlen
3,970,353 A 7/1976 Kaufman (Continued)

FOREIGN PATENT DOCUMENTS

CN 1175101 A 3/1998
CN 202633554 U 12/2012

(Continued)

OTHER PUBLICATIONS

International Search Report and Written Opinion dated Nov. 29, 2021 for International Application No. PCT/CN2021/114671.

(Continued)

*Primary Examiner* — Gary F Paumen
(74) *Attorney, Agent, or Firm* — Wolf, Greenfield & Sacks, P.C.

(57) ABSTRACT

An electrical connector comprises a housing and a plurality of contacts. The housing has a card slot for insertion of an electronic card and openings in two sides of the card slot. The plurality of contacts each comprises a plurality of separate members. Each member is in the shape of a beam with a contact portion, and each contact is inserted into one opening. A plurality of contact portions of each contact is arranged along an inserting direction of the electronic card. The electrical connector is easy to assemble, since it only needs to insert the plurality of members included in the contact corresponding to each opening in the housing into the opening. Thus, the cost can be reduced. The plurality of members are held on the housing through the corresponding opening and these members can be reliably fixed to the housing without an additional fixing component. Thus, the electrical connector has a simple structure. In addition, manufacturing each contact into several separate members causes the structure of each member simple, thereby reducing the processing difficulty of the contact and further reducing the cost.

26 Claims, 9 Drawing Sheets

(58) Field of Classification Search
USPC .................................................. 439/515, 637
See application file for complete search history.

(56) References Cited

U.S. PATENT DOCUMENTS

| | | | | |
|---|---|---|---|---|
| 4,487,468 | A | 12/1984 | Fedder et al. | |
| 4,734,041 | A * | 3/1988 | Bruchmann ........... | H01R 12/82 439/924.1 |
| 5,393,247 | A | 2/1995 | DiOrazio et al. | |
| 5,580,257 | A * | 12/1996 | Harwath .............. | H01R 12/721 439/607.06 |
| 5,810,623 | A | 9/1998 | Regnier et al. | |
| 5,876,214 | A * | 3/1999 | McHugh .............. | H01R 12/721 439/60 |
| 5,997,312 | A * | 12/1999 | Ho ....................... | H01R 12/721 439/60 |
| 6,638,105 | B1 | 10/2003 | Wu | |
| 6,645,012 | B2 * | 11/2003 | Ito ........................ | H01R 12/721 439/862 |
| 6,648,682 | B1 | 11/2003 | Wu | |
| 6,749,463 | B1 | 6/2004 | Fan | |
| 7,008,250 | B2 | 3/2006 | Shuey et al. | |
| 7,008,267 | B2 | 3/2006 | Fan | |
| 7,074,067 | B2 | 7/2006 | Yang et al. | |
| 7,607,949 | B2 * | 10/2009 | Hsu ........................ | H01R 27/00 439/267 |
| 7,637,783 | B2 * | 12/2009 | Sasaoka ............... | H01R 12/721 439/862 |
| 7,677,907 | B2 | 3/2010 | Guan et al. | |
| 7,731,541 | B1 | 6/2010 | Lee et al. | |
| 7,892,006 | B2 | 2/2011 | Guan et al. | |
| 7,972,171 | B2 | 7/2011 | Teh | |
| 8,142,207 | B1 | 3/2012 | Ljubijankic et al. | |
| 8,187,031 | B2 | 5/2012 | Li et al. | |
| 8,403,689 | B2 | 3/2013 | Li et al. | |
| 8,535,077 | B2 | 9/2013 | Shen et al. | |
| 8,721,350 | B2 | 5/2014 | Liu et al. | |
| 9,166,317 | B2 | 10/2015 | Briant et al. | |
| 9,325,090 | B2 | 4/2016 | Shen et al. | |
| 9,431,734 | B2 | 8/2016 | Guo et al. | |
| 9,685,723 | B2 | 6/2017 | Kee Mew | |
| 9,887,485 | B2 | 2/2018 | Lambie et al. | |
| 10,103,476 | B1 | 10/2018 | Qiu et al. | |
| 10,135,165 | B2 | 11/2018 | Zuo | |
| 10,224,653 | B2 | 3/2019 | Niu et al. | |
| 10,461,467 | B2 | 10/2019 | Eppley et al. | |
| 10,741,944 | B2 | 8/2020 | Long | |
| 10,855,020 | B1 | 12/2020 | Phillips et al. | |
| 10,916,894 | B2 | 2/2021 | Kirk et al. | |
| 11,374,340 | B2 | 6/2022 | Tang | |
| 11,545,769 | B2 | 1/2023 | Comerci et al. | |
| 11,637,391 | B2 | 4/2023 | Guo et al. | |
| 2005/0042928 | A1 | 2/2005 | Yi et al. | |
| 2007/0173118 | A1 | 7/2007 | Chen | |
| 2010/0075538 | A1 | 3/2010 | Ohshida | |
| 2011/0021080 | A1 * | 1/2011 | Kamiya ............... | H01R 12/778 29/874 |
| 2011/0065297 | A1 | 3/2011 | Guan et al. | |
| 2011/0067237 | A1 | 3/2011 | Cohen et al. | |
| 2011/0136388 | A1 | 6/2011 | Fu et al. | |
| 2011/0275238 | A1 | 11/2011 | Iijima et al. | |
| 2012/0178274 | A1 | 7/2012 | Manickam | |
| 2012/0202387 | A1 | 8/2012 | McNamara | |
| 2013/0280926 | A1 | 10/2013 | Ono | |
| 2016/0020540 | A1 | 1/2016 | Shen et al. | |
| 2016/0118736 | A1 | 4/2016 | Hoyack et al. | |
| 2016/0190724 | A1 * | 6/2016 | Mito .................... | H01R 13/432 439/746 |
| 2016/0336667 | A1 | 11/2016 | Kee Mew | |
| 2017/0302031 | A1 | 10/2017 | Cheng et al. | |
| 2018/0198220 | A1 | 7/2018 | Sasame et al. | |
| 2019/0165518 | A1 | 5/2019 | Hsu et al. | |
| 2019/0199023 | A1 | 6/2019 | Soh | |
| 2020/0076131 | A1 | 3/2020 | Hu et al. | |
| 2020/0076135 | A1 | 3/2020 | Tang et al. | |
| 2020/0203867 | A1 | 6/2020 | Lu | |
| 2021/0288423 | A1 | 9/2021 | Guo et al. | |
| 2021/0351529 | A1 | 11/2021 | Yang et al. | |
| 2022/0037828 | A1 | 2/2022 | Hu et al. | |
| 2022/0069496 | A1 | 3/2022 | Yi et al. | |
| 2022/0181809 | A1 | 6/2022 | Xie et al. | |
| 2022/0181811 | A1 | 6/2022 | Liu et al. | |
| 2022/0247107 | A1 | 8/2022 | Tang et al. | |
| 2023/0096092 | A1 | 3/2023 | Hu | |
| 2023/0126150 | A1 | 4/2023 | Yang et al. | |
| 2023/0163500 | A1 | 5/2023 | Yang et al. | |
| 2023/0178916 | A1 | 6/2023 | Yang et al. | |

FOREIGN PATENT DOCUMENTS

| | | | |
|---|---|---|---|
| CN | 203660106 | U | 6/2014 |
| CN | 105703103 | A | 6/2016 |
| CN | 108539464 | A | 9/2018 |
| CN | 212874843 | U | 4/2021 |
| CN | 214505858 | U | 10/2021 |
| EP | 0820124 | A2 | 1/1998 |
| GB | 227943 | A | 1/1925 |
| TW | 200835073 | A | 8/2008 |
| TW | M475740 | U | 4/2014 |
| WO | WO 02/073819 | A2 | 9/2002 |

OTHER PUBLICATIONS

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL: https://www.tomshardware.com/news/what-we-know-ddr5-ram,39079.html [last accessed Jul. 21, 2022].

He et al., Reliable, Robust Card Edge Connector, U.S. Appl. No. 18/133,601, filed Apr. 12, 2023.

Yang et al., Field Installable Card Edge Connector, U.S. Appl. No. 18/101,998, filed Jan. 26, 2023.

U.S. Appl. No. 17/950,364, filed Sep. 22, 2022, Hu.

U.S. Appl. No. 17/973,913, filed Oct. 26, 2022, Yang et al.

U.S. Appl. No. 17/988,330, filed Nov. 16, 2022, Yang et al.

U.S. Appl. No. 18/075,246, filed Dec. 5, 2022, Yang et al.

U.S. Appl. No. 18/101,998, filed Jan. 26, 2023, Yang et al.

U.S. Appl. No. 18/133,601, filed Apr. 12, 2023, He et al.

* cited by examiner

ELECTRICAL CONNECTOR AND MANUFACTURING METHOD THEREOF

CROSS-REFERENCE TO RELATED APPLICATIONS

This application claims priority to and the benefit of Chinese Patent Application Serial Nos. 202020977155.1 and 202010485530.5, filed on Jun. 1, 2020. The entire contents of these applications are incorporated herein by reference in their entirety.

TECHNICAL FIELD

The present disclosure relates to electrical connectors and manufacturing method thereof.

BACKGROUND

As a transmission medium, a card edge connector has been widely applied in an electronic product such as a computer. The card edge connector can be used to connect an electronic card such as a memory card, a graphics card and a sound card to a circuit board, so that the electronic card can provide a memory capacity for an electronic product and enhance an operating speed of the electronic product and other related performances thereof. With the advent of the information age, people's requirements for the operating frequencies and functions of electronic products are higher and higher. Electronic cards and card edge connectors with new technology are better meeting people's requirements.

However, products of memory series all have the problem of intermittence, which is a common defect in the entire industry. The main reason for this defect is that contaminants such as dust usually adhere to a conductive terminal of the memory card.

BRIEF SUMMARY

In according to an aspect of the present disclosure, an electrical connector is provided. The electrical connector may comprise a housing and a plurality of contacts. The housing may have a card slot and a plurality of openings on two sides of the card slot. The plurality of contacts may each comprise a plurality of separate members. Each member may be in the shape of a beam with a contact portion, and each contact may be inserted into one of the plurality of openings. A plurality of contact portions of each contact may be arranged along an inserting direction.

In some embodiments, an end of each member away from a mouth of the card slot may be fixed in the opening and the contact portion of each member may be arranged at an end of the member close to the mouth of the card slot.

In some embodiments, the housing may have an interfacing surface and a mounting surface which may be opposite to each other along the inserting direction. The card slot may be arranged in the interfacing surface, and each of the openings may comprise a first sub-opening and a second sub-opening which may be communicated with each other. The first sub-opening may extend from the mounting surface to an inner side wall of the card slot and may communicate with the card slot, and the second sub-opening may be located on an outer side of the first sub-opening relative to the card slot. A longitudinal dimension of the second sub-opening may be greater than a longitudinal dimension of the first sub-opening. The second sub-opening may extend from the mounting surface into the housing, and the card slot may extend along a longitudinal direction.

In some embodiments, the plurality of members of each contact may each comprise a main body and a contact arm which may be connected to each other. The main body may be closer to the mounting surface than the contact arm, the contact portion may be located on the contact arm, a longitudinal dimension of the main body of each of the plurality of members may be greater than a longitudinal dimension of the contact arm of this member, and the bodies of the plurality of members of each contact may be press-fitted into the second sub-opening.

In some embodiments, the main body of at least one of the plurality of members of each contact may have an elastic lug. The elastic lug may protrude from this main body along a direction perpendicular to the inserting direction and may be abutted against an inner side wall of the second sub-opening or an adjacent member.

In some embodiments, the contact arms of the plurality of members of each contact may be accommodated in the first sub-opening.

In some embodiments, the first sub-opening may communicate with the second sub-opening through a trapezoidal opening along the inserting direction, and the trapezoidal opening may be gradually increased along the inserting direction.

In some embodiments, each of the openings may further comprise a third sub-opening. The third sub-opening may be communicated with the first sub-opening, and the third sub-opening may be located on the outer side of the first sub-opening relative to the card slot. The third sub-opening may be closer to the interfacing surface than the second sub-opening, and a longitudinal dimension of the third sub-opening may be greater than the longitudinal dimension of the first sub-opening.

In some embodiments, the first sub-opening and the third sub-opening may extend to the interfacing surface.

In some embodiments, the plurality of members of each contact may be arranged along the inserting direction. The closer to a mouth of the card slot a member is, the closer to an outer side relative to the card slot in a transverse direction the member is. The transverse direction may be perpendicular to the inserting direction and perpendicular to a longitudinal direction in which the card slot extends.

In some embodiments, at least one of the plurality of members of each contact may have a protrusion, and this member may be engaged with an adjacent member through the protrusion.

According to another aspect of the present disclosure, an electrical connector is provided. The electrical connector may comprise a housing and contacts. The housing has a card slot. The contacts may be arranged in the housing. Each contact may comprise a first member and a second member. Each of the first member and the second member may be beam-shaped. A protrusion may be arranged on the first member or the second member. The first member may be engaged with the second member through the protrusion. The first member may have a first contact portion, the second member may have a second contact portion, and the first contact portion and the second contact portion may be arranged along an inserting direction.

In some embodiments, a positioning groove may be formed in the first member and may extend along the inserting direction to an end surface of the first member away from the card slot, and the protrusion may be arranged on the second member and inserted into the positioning groove.

In some embodiments, a U-shaped cut may be formed in the second member, and a portion surrounded by the U-shaped cut may be pushed out to form the protrusion.

In some embodiments, the first member may further comprise a first main body and a first contact arm. The first main body may have a first end and a second end which may be opposite to each other, and the first end may be closer to a mouth of the card slot than the second end. The first contact arm has an inverted J shape. An opening direction of the J shape may be identical with the inserting direction. A long end portion of the first contact arm may be connected to the first end of the first main body. The first contact portion may be arranged at a short end portion of the first contact arm, and the first contact arm may be located on an inner side of the first main body relative to the card slot.

In some embodiments, the second member may be located on an inner side of the first member relative to the card slot and may comprise a second main body and a second contact arm. The protrusion may be arranged on the second main body. The second main body may be engaged with the first main body through the protrusion. The second main body may have a third end and a fourth end which may be opposite to each other, and the third end may be closer to the mouth of the card slot than the fourth end. The second contact arm may have a V shape with an opening towards an outer side of the card slot, so that a corner point of the V shape may face the card slot. One end of the second contact arm may be connected to the third end of the second main body. The second contact portion may be located at the corner point, and the second contact arm may be located on an inner side of the second main body relative to the card slot.

In some embodiments, the second member may further comprise a connecting arm, the connecting arm may have a V shape with an opening towards the outer side of the card slot, and the second contact arm may be connected to the third end of the second main body through the connecting arm.

In some embodiments, the connecting arm may be located on an outer side of the second contact arm and the inner side of the second main body relative to the card slot.

In some embodiments, the housing may further have openings, the openings may be in two sides of the card slot, and the first main body and the second main body of each contact may be press-fitted into the same opening.

In some embodiments, an elastic lug may be arranged on the second main body, the elastic lug and the protrusion protrude may protrude along opposite directions, and the elastic lug may be abutted against an inner side wall of the opening.

In some embodiments, the elastic lug may be formed by forming a cut in the second main body and pushing out a portion surrounded by the cut.

In some embodiments, the second member may further comprise a mounting terminal portion. The mounting terminal portion may extend along a transverse direction from the fourth end of the second main body and may be located outside the housing, and the transverse direction may be perpendicular to the inserting direction and perpendicular to an extending direction of the card slot.

According to yet another aspect of the present disclosure, a method for manufacturing an electrical connector is provided. The method may comprise: inserting a first member in each of a plurality of openings of a housing; and inserting a second member into each of the plurality of openings so as to electrically and mechanically connect the first member and the second member.

It can be seen that it is easy to assemble this electrical connector, since it only needs to insert the plurality of members included in the contact corresponding to each opening in the housing into the opening. Thus, the cost can be reduced. The plurality of members is held on the housing through the corresponding opening and these members can be reliably fixed to the housing without an additional fixing component. Thus, the electrical connector has a simple structure. In addition, manufacturing each contact into several separate members causes the structure of each member simple, thereby reducing the processing difficulty of the contact and further reducing the cost.

A series of concepts in a simplified form is introduced in the content of the present disclosure and will be described in further detail in the Detailed Description. The Summary of the present disclosure does not intend to define key features and essential technical features of the claimed technical solution, nor does it intend to determine the scope of protection of the claimed technical solution.

The foregoing aspects may be used separately or together, in a combination of two or more aspects. Features and advantages of the present disclosure are described in detail below with reference to the accompanying drawings.

BRIEF DESCRIPTION OF DRAWINGS

The following accompanying drawings of the present disclosure are used here as a part of the present disclosure for understanding the present disclosure. The embodiments and their descriptions of the present disclosure are illustrated in the accompanying drawings to explain the principle of the present disclosure. In drawings.

The above accompanying drawings include the following reference signs:

10—electrical connector; 20—housing; 21—interfacing surface; 22—mounting surface; 23—card slot; 24Y1, 24Y2—opening; 241—first sub-opening; 242—second sub-opening; 243—trapezoidal opening; 245—third sub-opening; 30Y1, 30Y2—contact; 31Y1, 31Y2—first member; 32Y1, 32Y2—second member; 311Y1, 311Y2—first contact portion; 312—first main body; 312A—first end; 312B—second end; 313—first contact arm; 313A—long end portion; 313B—short end portion; 314—first transition portion; 315—positioning groove; 321Y1, 321Y2—second contact portion; 322—second main body; 322A—third end; 322B—fourth end; 323—second contact arm; 324—second transition portion; 325—protrusion; 326—elastic lug; 327—connecting arm; 328—mounting terminal portion; and 40X1, 40X2—hook.

DETAILED DESCRIPTION

In the following description, numerous details are provided to enable a thorough understanding of the present disclosure. However, a person skilled in the art may understand that the following description only exemplarily shows the preferred embodiments of the present disclosure, and the present disclosure may be implemented without one or more such details. In addition, in order to avoid confusion with the present disclosure, some technical features known in the art have not been described in detail.

The present disclosure relates to an electrical connector, which is suitable for use in miniaturized electronic devices where it provides reliable operation. Such an electrical connector may comprise a housing and a plurality of contacts. The housing may have a card slot for insertion of an electronic card and openings in two sides of the card slot. The plurality of contacts may each comprise a plurality of separate members. Each member may be in the shape of a beam with a contact portion, and each contact may be inserted into one opening. A plurality of contact portions of each contact may be arranged along an inserting direction of the electronic card. The electrical connector is easy to assemble, since it only needs to insert the plurality of members included in the contact corresponding to each opening in the housing into the opening. Thus, the cost can be reduced. The plurality of members may be held on the housing through the corresponding opening and these members can be reliably fixed to the housing without an additional fixing component. Thus, the electrical connector has a simple structure. In addition, manufacturing each contact into several separate members causes the structure of each member simple, thereby reducing the processing difficulty of the contact and further reducing the cost.

Figure 1B:
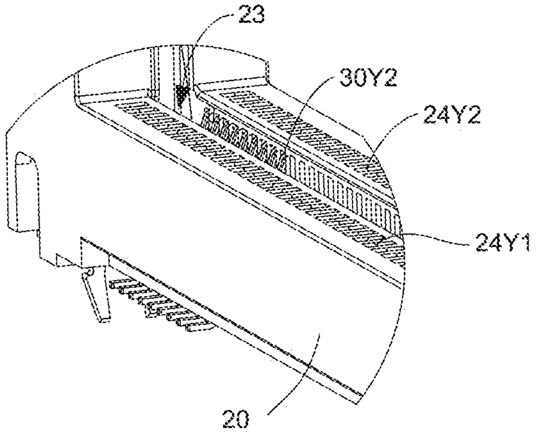
FIG. 1B is an enlarged view of a region marked by a circle in FIG. 1A.
Figure 1A:
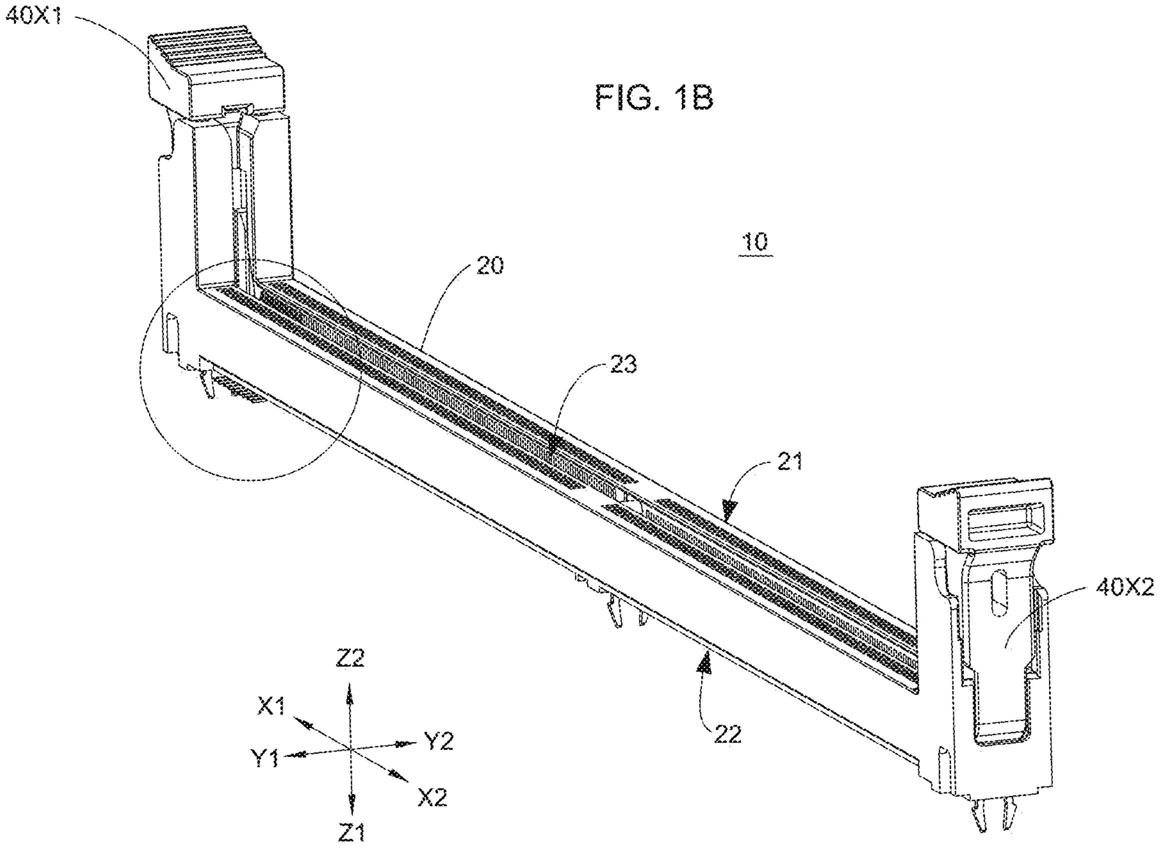
FIG. 1A is a perspective view of an electrical connector according to an exemplary embodiment of the present disclosure.

As shown in FIGS. 1A-1B and 2-3, an electrical connector 10 according to an embodiment of the present disclosure includes a housing 20 and contacts 30Y1 and 30Y2. An electronic card such as DDR5 (not shown) may be inserted onto the electrical connector 10 and the electrical connector 10 is mounted to a circuit board (not shown). The contacts 30Y1 and 30Y2 electrically connect the electronic card to the circuit board. In FIGS. 1A-1B and the following views, X1-X2 represents the longitudinal direction (i.e., the length direction) of the electrical connector 10; Y1-Y2 represents the transverse direction (i.e., the width direction) of the electrical connector 10; and Z1-Z2 represents the vertical direction (i.e., the height direction) of the electrical connector 10.

The housing 20 is made of an insulating material and takes the shape of an elongated strip extending along the longitudinal direction X1-X2. Hooks 40X1 and 40X2 are arranged at two ends of the housing 20 along the longitudinal direction. The housing 20 may have a interfacing surface 21 and a mounting surface 22. The interfacing surface 21 and the mounting surface 22 are opposite along the transverse direction Y1-Y2. The interfacing surface 21 faces the electronic card, while the mounting surface 22 faces the circuit board. The interfacing surface 21 has a card slot 23 extending along the longitudinal direction X1-X2. The card slot 23 is recessed inwards from the interfacing surface 21 for receiving the electronic card. The electronic card is inserted into the card slot 23 along an inserting direction Z1. The card slot 23 is substantially in the shape of an elongated strip, as shown in FIG. 1A. The electronic card may include any one of a graphics card, a memory card, a sound card and the like.

The housing 20 also has openings 24Y1 and 24Y2. The openings 24Y1 and 24Y2 take the shape of a slit. The openings 24Y1 are located on one side of the card slot 23 approximately equidistantly along the transverse direction Y1-Y2. The openings 24Y2 are located on the other side of the card slot 23 approximately equidistantly along the transverse direction Y1-Y2. The openings 24Y1 and 24Y2 extend to the mounting surface 22 of the housing 20 along the vertical direction and extend to an inner side wall of the card slot 23.

Figure 2:
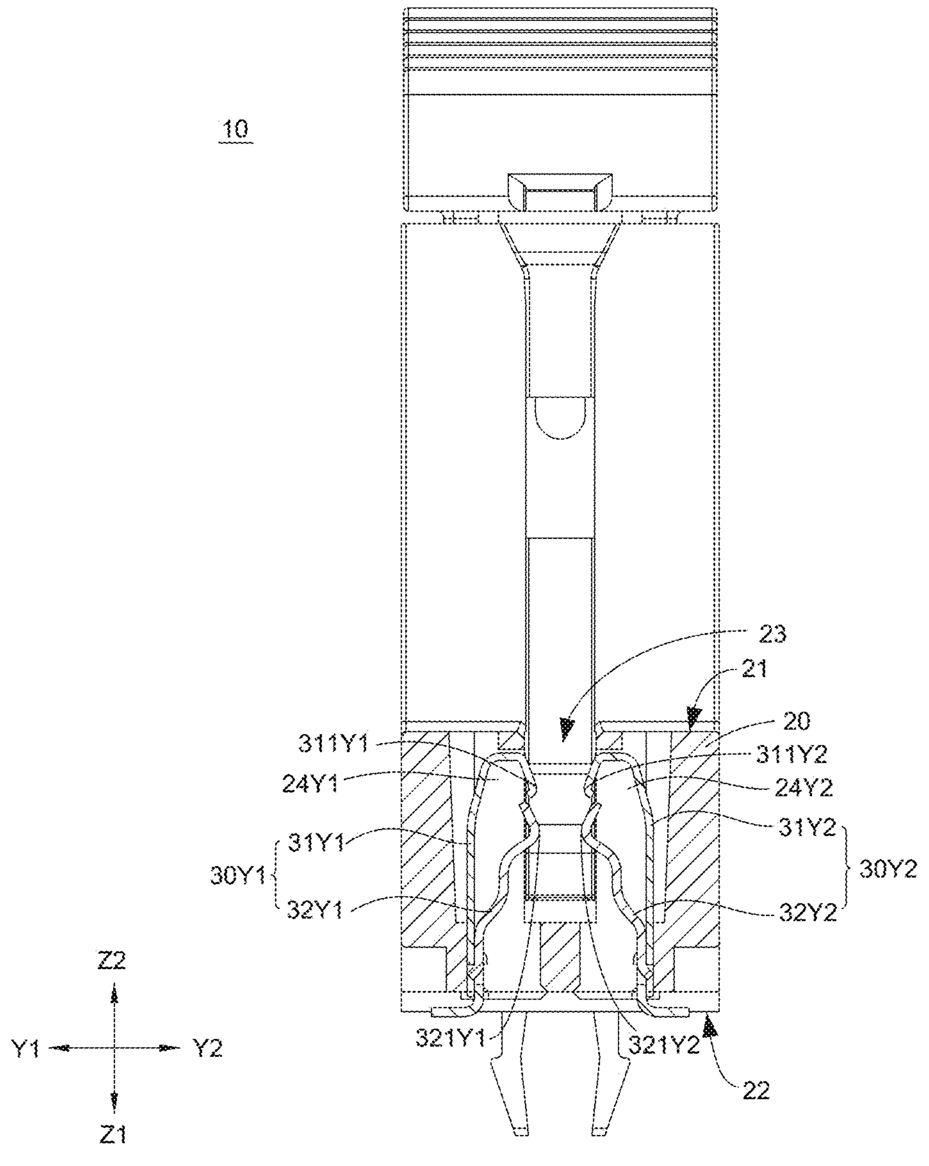
FIG. 2 is a sectional view of the electrical connector shown in FIG. 1A taken along a Y-Z plane.
Figure 3:
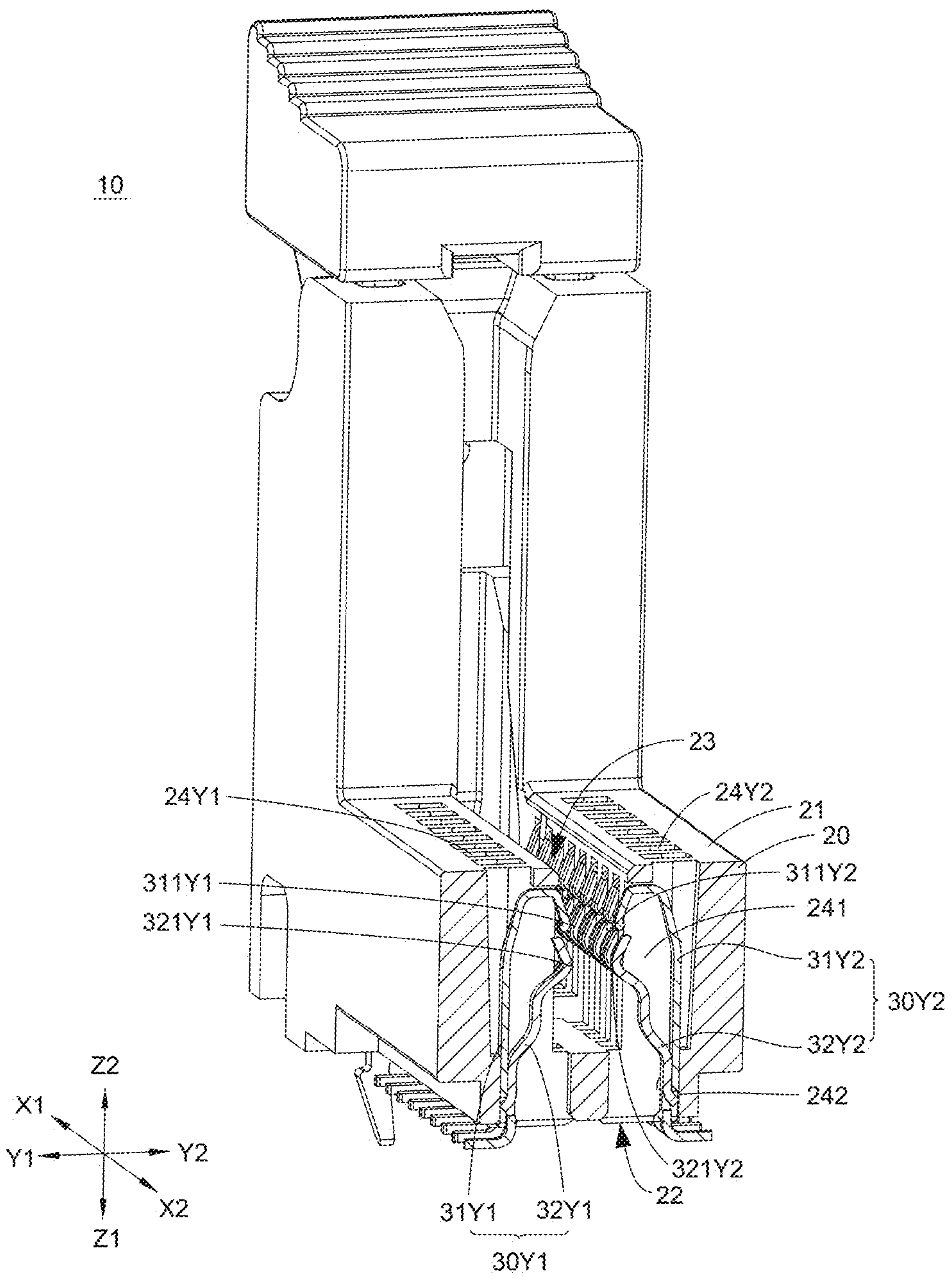
FIG. 3 is a perspective view of the electrical connector shown in FIG. 2.

As shown in FIGS. 2 and 3, the contacts 30Y1 and 30Y2 are inserted into the openings 24Y1 and 24Y2 respectively. The contacts 30Y1 are arranged in one row on the housing 20 along the longitudinal direction X1-X2, and the contacts 30Y2 are arranged in the other row on the housing 20 along the longitudinal direction X1-X2. These two rows of contacts are located on both sides of the card slot 23 respectively along the transverse direction Y1-Y2 and are symmetrical about the card slot 23. The card slot 23 exposes parts of contacts 30Y1 and 30Y2. In the case where the electronic card is inserted into the card slot 23, the exposed parts of the contacts 30Y1 and 30Y2 may be electrically connected to conductive contacts of the electronic card. The contacts 30Y1 and 30Y2 also extend to the mounting surface 22. In the case where the housing 20 is mounted to the circuit board, the contacts 30Y1 and 30Y2 may be electrically connected to circuits on the circuit board. Thus, the conductive contacts of the electronic card are electrically connected to the circuits on the circuit board.

As shown in FIGS. 2 and 3, contacts 30Y1 and 30Y2 each include a plurality of separate members. For example, the contact 30Y1 includes a first member 31Y1 and a second member 32Y1. The first member 31Y1 takes the shape of a beam with a first contact portion 311Y1. The second member 32Y1 takes the shape of a beam with a second contact portion 321Y1. The contact 30Y2 includes a first member 31Y2 and a second member 32Y2. The first member 31Y2 takes the shape of a beam with a first contact portion 311Y2. The second member 32Y2 takes the shape of a beam with a second contact portion 321Y2. The plurality of members of each contact is inserted into one opening. The first member 31Y1 and the second member 32Y1 are inserted into the opening 24Y1. The first member 31Y2 and the second member 32Y2 are inserted into the opening 24Y2. A plurality of contact portions of each contact is arranged along the inserting direction Z1 of the electronic card. The first contact portion 311Y1 and the second contact portion 321Y1 of the contact 30Y1 are arranged along the inserting direction Z1. The first contact portion 311Y2 and the second contact portion 321Y2 of the contact 30Y2 are arranged along the inserting direction Z1. In the embodiment shown in the figure, the first contact portions 311Y1 and 311Y2 are closer to a mouth of the card slot 23 than the second portions 321Y1 and 321Y2. The first contact portions 311Y1 and 311Y2 firstly contact the electronic card inserted into the card slot 23 for scraping and cleaning contaminants on the electronic card. The second contact portions 321Y1 and 321Y2 are electrically connected to the electronic card reliably.

In an assembly process, each of the plurality of openings 24Y1 and 24Y2 of the housing 20 may be inserted with a corresponding first member 31Y1 or 31Y2. Afterwards, each opening is inserted with a corresponding second member 32Y1 or 32Y2, so that the first member 31Y1 and the second member 32Y1 in each opening 24Y1 are electrically and mechanically connected, and the first member 31Y2 and the second member 32Y2 in each opening 24Y2 are electrically and mechanically connected.

Optionally, the contact may also include more members, such as three or four members. A person skilled in the art may determine the number of members for example according to the desired number of contact portions or other requirement. When the contact includes more than two members, it only needs to insert these members into each opening one by one during the assembly.

It is therefore easy to assemble this electrical connector 10, since it only needs to insert a plurality of members included in the contact corresponding to the each opening in the housing 20 into the opening. Thus, the cost can be reduced. The plurality of members is held on the housing 20 through the corresponding opening and these members can be reliably fixed to the housing 20 without an additional fixing component. Thus, the electrical connector 10 has a simple structure. In addition, manufacturing each contact into several separate members causes the structure of each member simple, thereby reducing the processing difficulty of the contact and further reducing the cost.

The contacts 30Y1 and 30Y2 are symmetrical about the card slot 23. Correspondingly, the openings 24Y1 and 24Y2 are symmetrical about the card slot 23. Therefore, the contacts and the openings which are on one side are only described in the following description. It should be noted that the contacts 30Y1 and 30Y2 may be aligned with each other or staggered by certain distance in position along the longitudinal direction X1-X2.

An end of each member away from the mouth of the card slot 23 is fixed in the corresponding opening. By taking the contact 30Y2 as an example, the ends of the first member 31Y2 and the second member 32Y2 away from the mouth of the card slot 23 (i.e., lower ends close to the mounting surface 22 shown in the figure) are fixed in the opening 24Y2. The ends of the first member 31Y2 and the second member 32Y2 close to the mouth of the card slot 23 (i.e., upper ends close to the interfacing surface 21 shown in the figure) may be moved or deformed to a certain extent relative to the opening 24Y2. The first contact portion 311Y2 is located at the upper end of the first member 31Y2. The second contact portion 321Y2 is located at the upper end of the second member 32Y2. In this way, when the electronic card is inserted into the card slot 23, the electronic card may extrude the first contact portion 311Y2 of the first member 31Y2 and the second contact portion 321Y2 of the second member 32Y2 so as to effectively clean the electronic card and establish a reliable electrical connection with the electronic card. In addition, the electronic card may also be firmly held in the card slot 23 through an acting force applied to the electronic card by the upper ends of the first member 31Y2 and the second member 32Y2, and the electronic card forms a reliable mechanical and electrical connection with the electrical connector.

Figure 5:
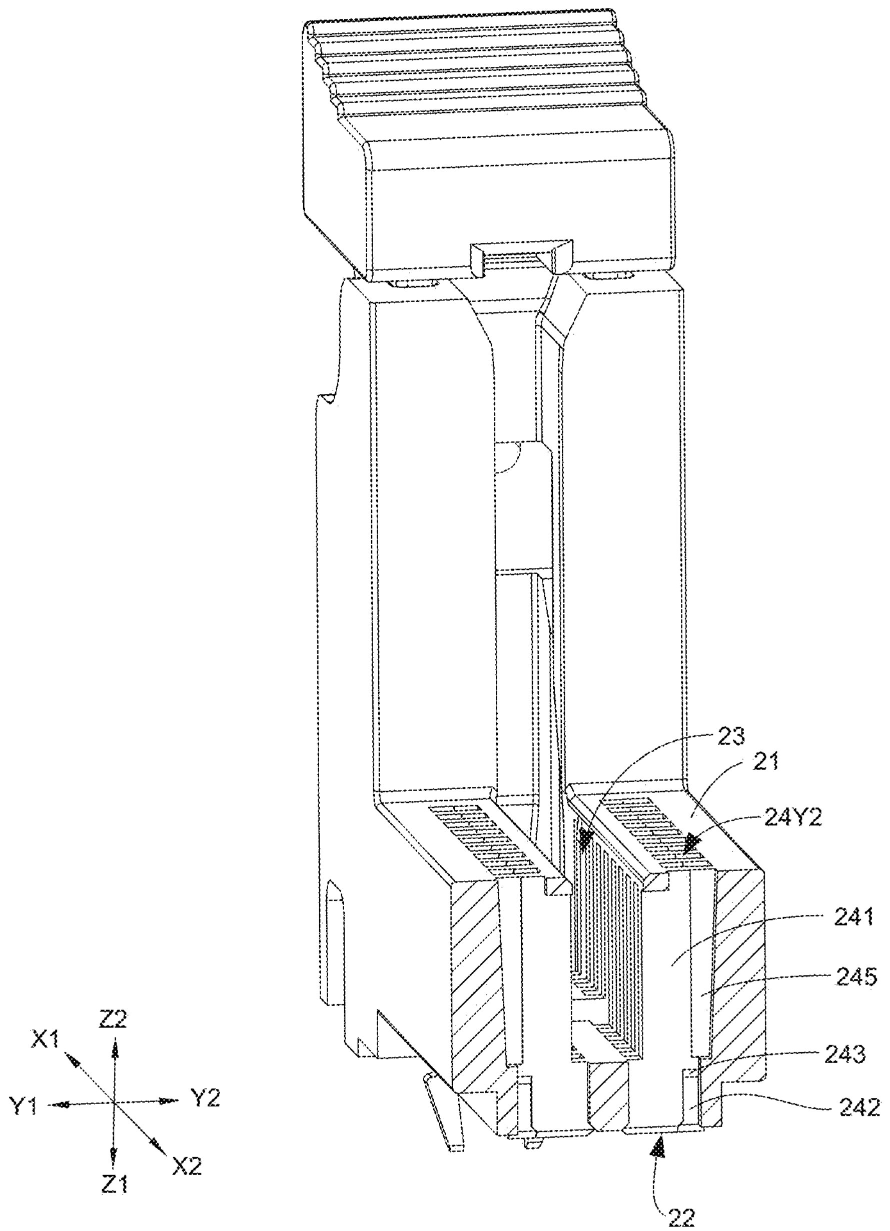
FIG. 5 shows an electrical connector with a contact removed compared with the electrical connector shown in FIG. 3.
Figure 6:
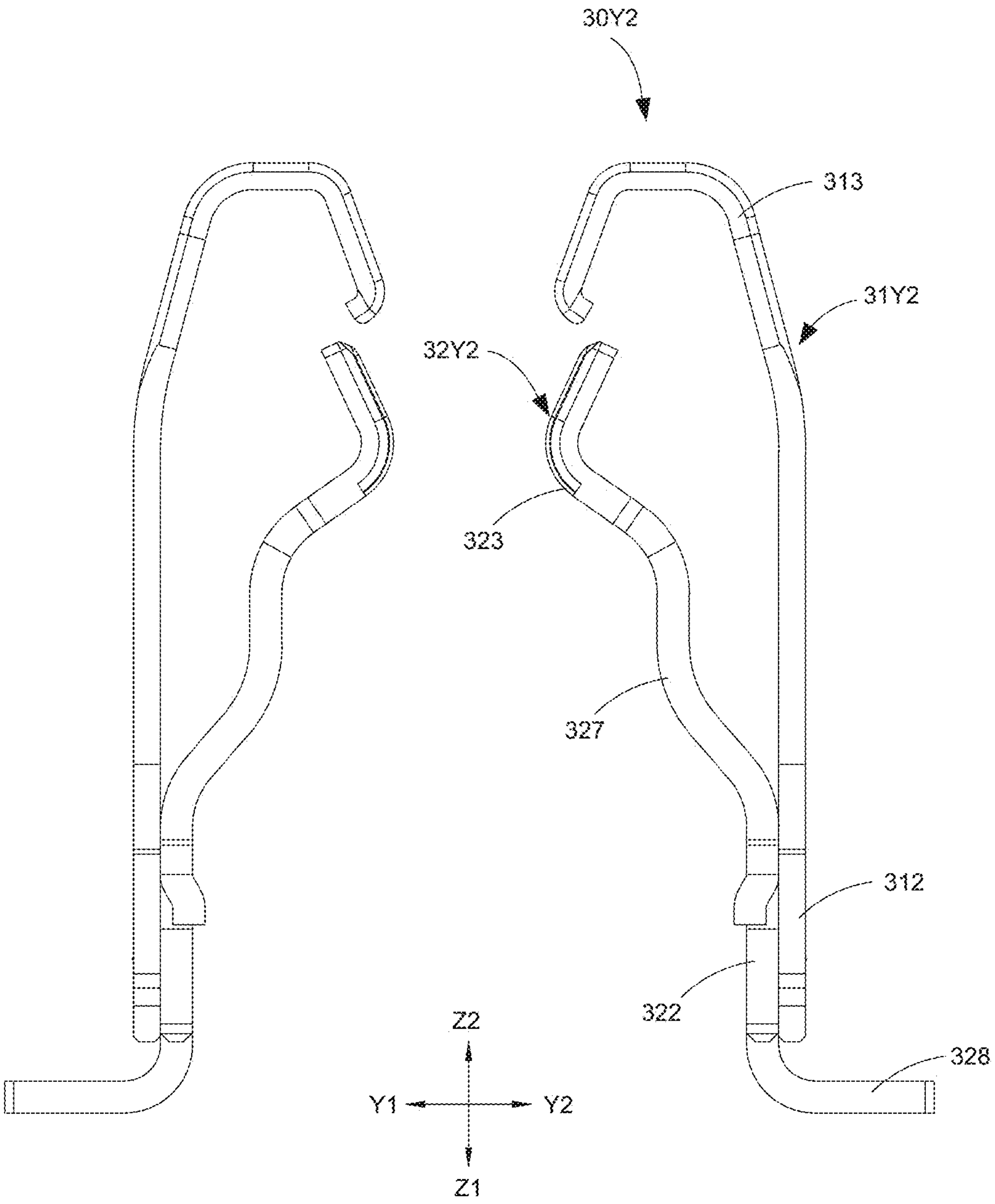
FIG. 6 is a front view of a contact according to an exemplary embodiment of the present disclosure.
Figure 7:
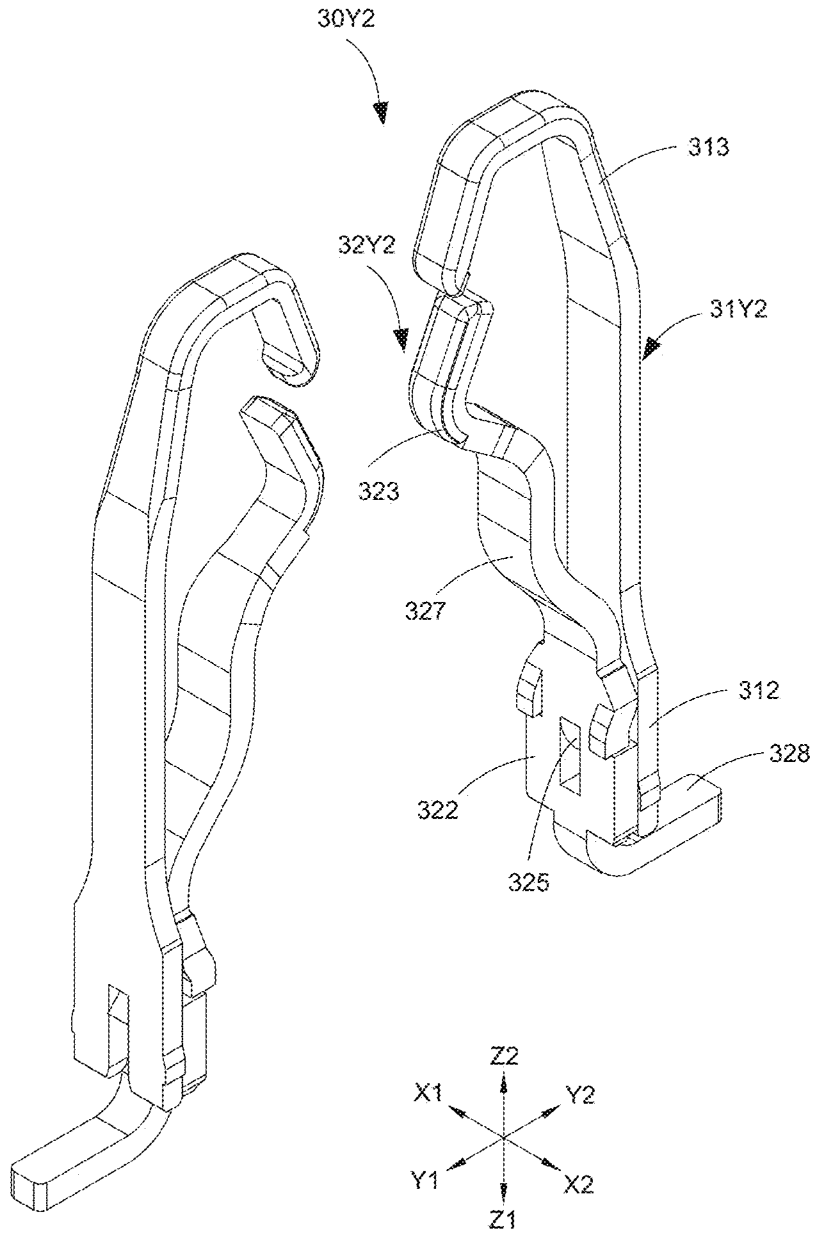
FIG. 7 is a perspective view of the contact shown in FIG. 6.
Figure 8:
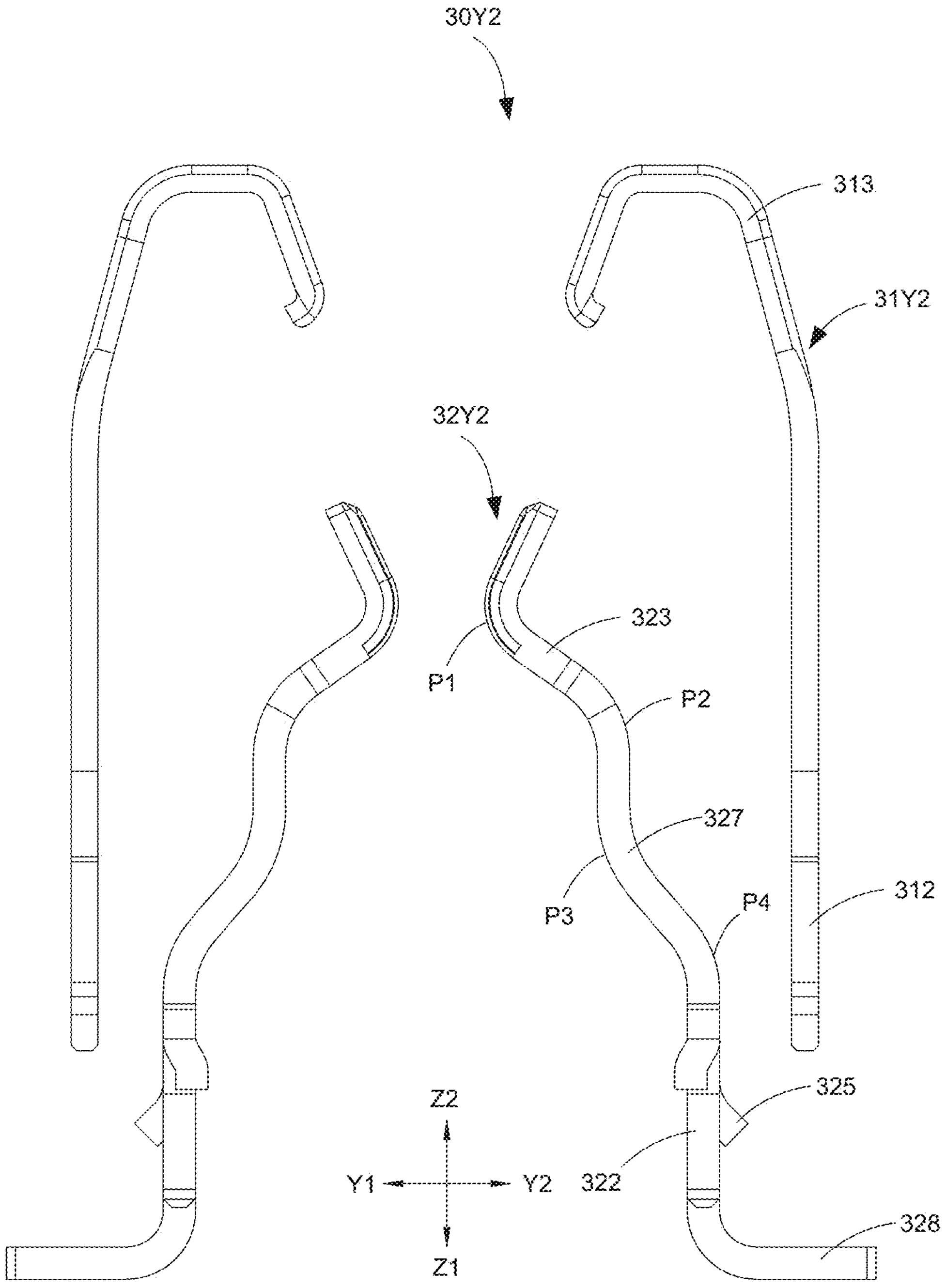
FIG. 8 is an exploded view of the contact shown in FIG. 6.

Each opening includes a first sub-opening and a second sub-opening which are communicated with each other. As shown in FIGS. 5 and 6, by taking the opening 24Y2 as an example, the opening 24Y2 includes a first sub-opening 241 and a second sub-opening 242. The first sub-opening 241 extends from the mounting surface 22 to the inner side wall of the card slot 23 and is communicated with the slot card 23. The second sub-opening 242 is located on an outer side of the first sub-opening 241 relative to the card slot 23. A longitudinal dimension of the second sub-opening 242 is greater than a longitudinal dimension of the first sub-opening 241. The longitudinal dimension refers to a dimension along the longitudinal direction X1-X2. The second sub-opening 242 extends from the mounting surface 22 into the housing 20. A vertical dimension of the second sub-opening 242 may be smaller than a half of a vertical dimension of the first sub-opening 241 along the vertical direction Z1-Z2.

Figure 9:
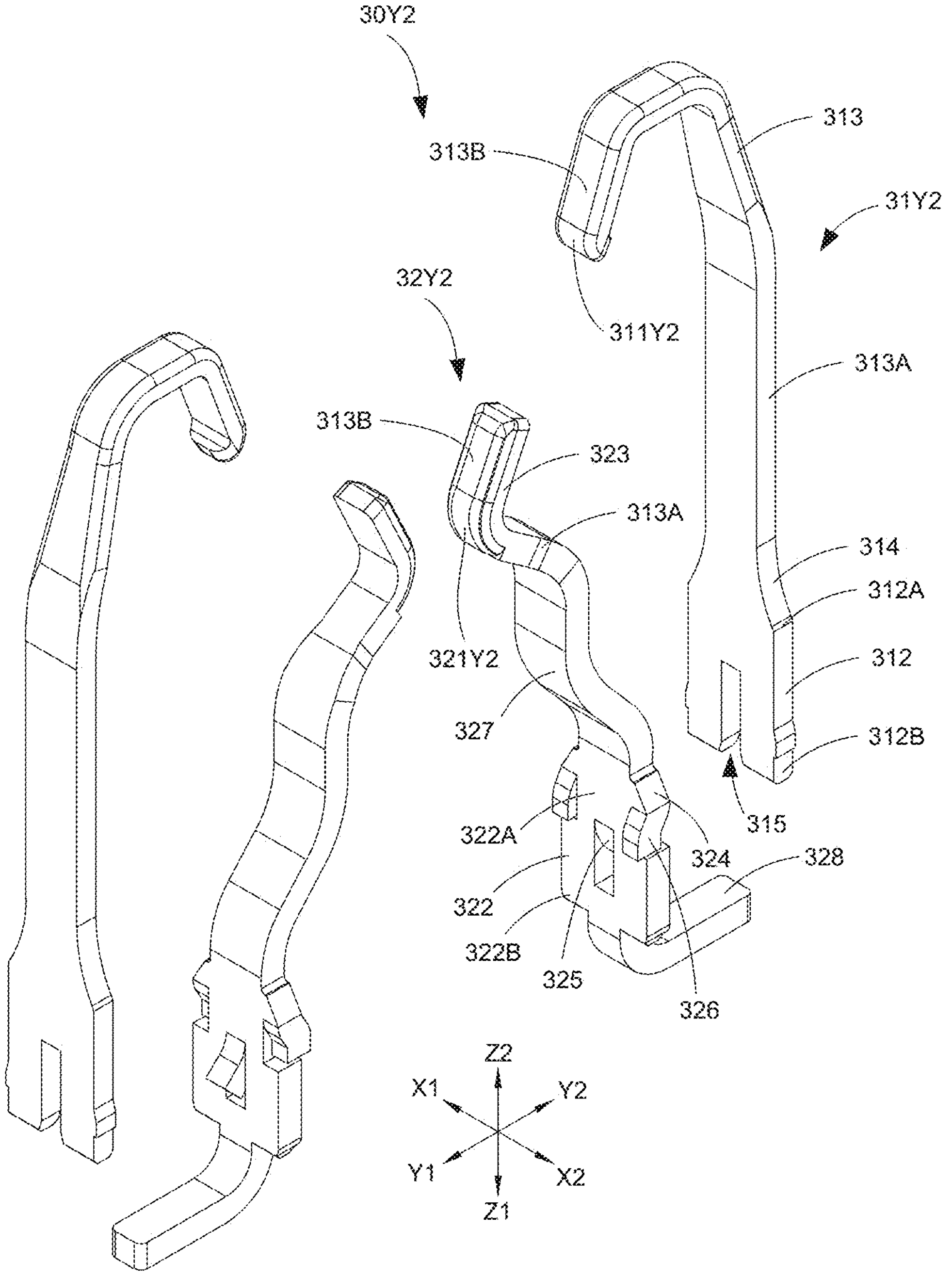
FIG. 9 is a perspective view of the contact shown in FIG. 8.

With reference to FIGS. 3 and 9, the first member 31Y2 of the contact 30Y2 may include a first main body 312 and a first contact arm 313. The first main body 312 and the first contact arm 313 are connected with each other. The first contact arm 313 is closer to the mouth of the card slot 23 than the first main body 312. That is, the first main body 312 is closer to the mounting surface 22. The first main body 312 has a first end 312A and a second end 312B which are opposite to each other. The first end 312A is closer to the mouth of the card slot 23 than the second end 312B. The first contact arm 313 is connected to the first end 312A of the first main body 312. The first contact portion 311Y2 is located on the first contact arm 313. A longitudinal dimension of the first main body 312 is greater than a longitudinal dimension of the first contact arm 313. The first main body 312 and the first contact arm 313 may be connected through a first transition portion 314, so that the longitudinal dimension of the first member 31Y2 transits smoothly from the first main body 312 to the first contact arm 313. Optionally, the first main body 312 and the first contact arm 313 may also be directly connected and thus an obvious right angle is formed between the first main body 312 and the first contact arm 313. With reference to FIGS. 3, 5 and 9, the longitudinal dimensions of the second sub-opening 242 and the first main body 312 are equivalent and the first main body 312 is press-fitted into the second sub-opening 242. Thus, the first member 31Y2 may be fixed through the second sub-opening 242.

As shown in FIG. 9, the first contact arm 313 may has an inverted J shape. An opening direction of the J shape is identical with the inserting direction Z1. The first contact arm 313 has a long end portion 313A and a short end portion 313B. The long end portion 313A of the first contact arm 313 is connected to the first end 312A of the first main body 312. The first contact portion 311Y2 is arranged at the short end portion 313B of the first contact arm 313. The first contact arm 313 is located on an inner side of the first main body 312 relative to the card slot 23. The first contact arm 313 is accommodated in the first sub-opening 241. The first contact arm 313 may be moved or deformed in the first sub-opening 241.

The plurality of members of each contact is arranged along the inserting direction Z1. The closer to a mouth of the card slot 23 the member is, the closer to an outer side relative to the card slot 23 in a transverse direction it is. In the embodiment shown in the figure, the second member 32Y2 is located on an inner side of the first member 31Y2 relative to the card slot 23. With continued reference to FIGS. 3 and 9, the first member 31Y2 substantially half-surrounds the second member 32Y2. The second member 32Y2 of the contact 30Y2 may include a second main body 322 and a second contact arm 323. The second main body 322 and the second contact arm 323 are connected with each other. The second contact arm 323 is closer to the mouth of the card slot 23 than the second main body 322. That is, the second main body 322 is closer to the mounting surface 22. The second main body 322 has a third end 322A and a fourth end 322B which are opposite to each other. The third end 322A is closer to the mouth of the card slot 23 than the fourth end 322B. The second contact arm 323 is connected to the third end 322A of the second main body 322. The second contact portion 321Y2 is located on the second contact arm 323. A longitudinal dimension of the second main body 322 is greater than a longitudinal dimension of the second contact arm 323.

The second main body 322 and the second contact arm 323 may also be connected with each other through an intermediate portion. Exemplarily, a second transition portion 324 may arranged between the second main body 322 and the second contact arm 323, so that a longitudinal dimension of the second member 32Y2 transits smoothly from the second main body 322 to the second contact arm 323. Optionally, the second main body 322 may also be directly connected to the second contact arm 323 and thus an obvious right angle is formed between the second main body 322 and the second contact arm 323. With reference to FIGS. 3, 5 and 9, the longitudinal dimensions of the second sub-opening 242 and the second main body 322 are equivalent and the second main body 322 is press-fitted into the second sub-opening 242. Thus, the second member 32Y2 may also be fixed through the second sub-opening 242.

With continued reference to FIGS. 3 and 9, the second contact arm 323 may have a V shape with an opening towards an outer side of the card slot, so that a corner point of the V shape faces the card slot 23. The second contact portion 321Y2 is arranged at the corner point. One end of the second contact arm 323 is connected to the third end 322A of the second main body 322. The second contact arm 323 is located on an inner side of the second main body 322 relative to the card slot 23. The second contact arm 323 is accommodated in the first sub-opening 241. The second contact arm 323 may be moved or deformed in the first sub-opening 241.

Along the transverse direction Y1-Y2, a sum of transverse dimensions of the first member 31Y2 and the second member 32Y2 is equivalent to a transverse dimension of the second sub-opening 242. Thus, the first main body 312 of the first member 31Y2 and the second main body 322 of the second member 32Y2 may be stably fixed to the housing 20 through the second sub-opening 242. In addition, when the first main body 312 and the second main body 322 are stacked together along the transverse direction Y1-Y2, the widened first main body 312 and second main body 322 are tightly fitted into the second sub-opening 242 conveniently.

In the assembly process, the first member 31Y2 may be firstly inserted into the opening 24Y2 from below. During insertion, the first contact arm 313 is aligned with the first sub-opening 241 and the first main body 312 is aligned with the second sub-opening 242. Since the longitudinal dimension of the first main body 312 is greater than the longitudinal dimension of the first sub-opening 241, the first main body 312 is restricted to be inserted only from the second sub-opening 242, and the first contact arm 313 may only be inserted from the first sub-opening 241. Thus, the first member 31Y2 may be inserted into the opening 24Y2 along the direction Z2. Afterwards, the second member 32Y2 is inserted into the opening 24Y2 from below. During insertion, the second contact arm 323 is aligned with the first sub-opening 241, the second main body 322 is aligned with the second sub-opening 242 and the second member 32Y2 is located on the inner side of the first member 31Y2. Since the longitudinal dimension of the second main body 322 is greater than the longitudinal dimension of the first sub-opening 241, the second main body 322 is restricted to be inserted only from the second sub-opening 242, and the second contact arm 323 may only be inserted from the first sub-opening 241. Thus, the second member 32Y2 may be inserted into the opening 24Y2 along the direction Z2. Hence, the assembly of the contact 30Y2 is completed.

Optionally, the first member 31Y2 and the second member 32Y2 may be tightly abutted against each other firstly and then inserted into the opening 24Y2. However, this has higher requirements for a fixture, which is able to clamp the first member 31Y2 and the second member 32Y2 and keep a position relationship between the first member 31Y2 and the second member 32Y2 unchanged during inserting them into the opening 24Y2. For the assembly mode in which the first member 31Y2 and the second member 32Y2 are inserted one by one, when the first member 31Y2 is mounted, the fixture only needs to press the inner side surface of the first main body 312 of the first member 31Y2 and the outer side surface of the first main body 312 is abutted against the second sub-opening, thereby completing the assembly of the first member 31Y2. When the second member 32Y2 is mounted, similarly, the fixture only needs to press the inner side surface of the second main body 322 of the second member 32Y2 and the outer side surface of the second main body 322 is abutted against the inner side surface of the first main body 312 of the first member 31Y2, thereby completing the assembly of the second member 32Y2. Thus, the requirement for the fixture can be reduced, the assembly process is simplified and the processing cost is lowered.

The plurality of members of each contact may be fixed to one another, in addition to being fixed through the second sub-opening 242. In a preferred embodiment, at least one of the plurality of members has a protrusion, and this member is engaged with an adjacent member through the protrusion. Exemplarily, the protrusion may be arranged on one of the first member 31Y2 and the second member 32Y2, and a positioning groove matching with the protrusion is formed in the other of the first member 31Y2 and the second member 32Y2. The protrusion may extend into the positioning groove, thereby keeping the position relationship between the first member 31Y2 and the second member 32Y2 to a certain extent. But, when the contact 30Y2 is assembled in a mode that the first member 31Y2 and the second member 32Y2 are inserted one by one, the protrusion needs to be arranged on the member which is inserted later.

In the embodiment shown in the figure, as shown in FIGS. 6-9, the protrusion 325 is arranged on the second main body 322. The second main body 322 is engaged with the first main body 312 through the protrusion 325. The positioning groove 315 is formed in the first member 31Y2. The positioning groove 315 extends along the inserting direction Z1 to an end surface of the first member 31Y2 away from the card slot 23. That is, the positioning groove 315 runs through the second end 312B of the second main body 322 along the inserting direction Z1. After the first member 31Y2 is assembled, when the second member 32Y2 is assembled, the protrusion 325 of the second member 32Y2 is aligned with the positioning groove 315, and the second member 32Y2 is inserted into the opening 24Y2 while the protrusion 325 is inserted into the positioning groove 315. Thus, the first member 31Y2 and the second member 32Y2 may be fixed into the opening 24Y2 more reliably.

The protrusion 325 may be formed on the second member 32Y2 in any proper manner. Usually, the second member 32Y2 is a sheet metal part. In this case, a U-shaped cut may be formed in the second member 32Y2, and a portion surrounded by the U-shaped cut is pushed out to form the protrusion 325. Thus, the manufacturing process may be simplified and the cost is reduced.

Considering the existence of a manufacturing tolerance, the main body of at least one of the plurality of members of each contact may have an elastic lug. The elastic lug may protrude from this main body along a direction perpendicular to the inserting direction, such as the direction Y1, Y2, X1 and/or X2. The elastic lug may be abutted against an inner side wall of the second sub-opening or the adjacent member along its protruding direction. Thus, the situation that the main body of the member cannot be press-fitted into the second sub-opening due to a relatively larger manufacturing tolerance can be avoided, and further the unfirm assembly is avoided.

In the embodiment shown in the figure, the elastic lug 326 may be arranged on the second main body 322. The elastic lug 326 and the protrusion 325 protrude in opposite directions. The elastic lug 326 is abutted against the inner side wall of the opening. Specifically, the elastic lug 326 is abutted against the inner side wall of the second sub-opening 242. In the case where the second member 32Y2 is the sheet metal part, the elastic lug 326 may be formed by forming a cut in the second main body 322 and then pushing out the portion surrounded by the cut.

Figure 4:
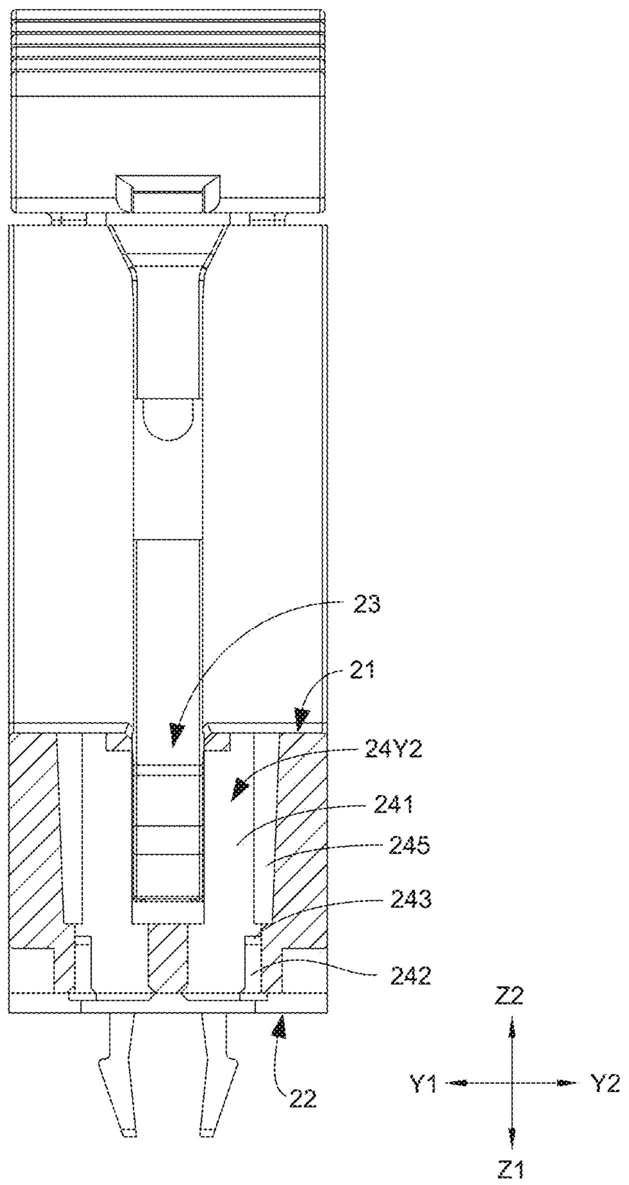
FIG. 4 shows an electrical connector with a contact removed compared with the electrical connector shown in FIG. 2.

As described above, the first member 31Y2 may include the first transition portion 314, and the second member 32Y2 may include the second transition portion 324, so that neither the first member 31Y2 nor the second member 32Y2 has an abrupt right angle. In this case, the first sub-opening 241 is communicated with the second sub-opening 242 through a trapezoidal opening 243 along the inserting direction Z1, as shown in FIGS. 4 and 5. The trapezoidal opening 243 is gradually increased along the inserting direction Z1. Thus, when the first member 31Y2 and the second member 32Y2 are mounted in the opening 24Y2, two side surfaces of the first transition portion 314 and the second transition portion 324 may be abutted against side walls of the trapezoidal opening 243. These two side surfaces of the first transition portion 314 and the second transition portion 324 are opposite along the longitudinal direction X1-X1.

In addition, each opening 24Y2 may also include a third sub-opening 245, as shown in FIGS. 4 and 5. The third sub-opening 245 is communicated with the first sub-opening 241 and is located on the outer side of the first sub-opening 241 relative to the card slot 23. The third sub-opening 245 is closer to the interfacing surface 21 than the second sub-opening 242. A longitudinal dimension of the third sub-opening 245 is greater than the longitudinal dimension of the first sub-opening 241. In this way, manufacture of a mould is facilitated and the mechanical strength of the mould is increased. Certainly, optionally, the third sub-opening 245 may also have the same longitudinal dimension as the first sub-opening 241, but the mechanical strength of the mould will be slightly weaker.

Optionally, the first sub-opening 241 and the third sub-opening 245 extend to the interfacing surface 21. Thus, the interfacing surface 21 may expose the corresponding contact through the opening. In this way, on the one hand, it is convenient to mold the housing 20, and on the other hand, it may dissipate heat from the contact.

Referring back to FIGS. 6-9, the second member 32Y2 may further include a connecting arm 327. The connecting arm 327 has a V shape with an opening towards an outer side of the card slot 23. The second contact arm 323 is connected to the third end 322A of the second main body 322 through the connecting arm 327. The connecting arm 327 is located on an outer side of the second contact arm 323 and the inner side of the second main body 322 relative to the card slot 23. Thus, four corner points P1, P2, P3 and P4 may be formed on the second member 32Y2, with reference to FIG. 8. The corner point P1 is located on the first contact arm 313, the corner point P2 is located between the first contact arm 313 and the connecting arm 327, the corner point P3 is located on the connecting arm 327, and the corner point P4 is located between the connecting arm 327 and the second main body 322. The connecting arm 327 may enhance the mechanical strength of the second member 32Y2, and increase the deformation amount of the second contact arm 323 relative to the second main body 322. When the electronic card is inserted into the card slot 23, the second contact arm 323 has an enough capability and space to move towards the outer side. Thus, the reliability of the electrical connection between the second member 32Y2 and the electronic card may be improved. In addition, the connecting arm 327 may also increase the length of a force arm. When the electronic card is inserted into the card slot 23, the second contact arm 323 will be pressed against and the connecting arm 327 may enhance the elasticity of the second member 32Y2. Thus, the deformation of the second member 32Y2 is reduced and the reliability of electrical contact is improved.

Further, the second member 32Y2 may further include a mounting terminal portion 328. The mounting terminal portion 328 extends from the fourth end portion 322B of the second main body 322 along the transverse direction. With reference to FIGS. 3 and 9, the mounting terminal portion 328 is located outside the housing 20. When the electrical connector 10 is mounted on the circuit board, the electrical connector 10 may be electrically connected with the circuit board through the mounting terminal portion 328. The mounting terminal portion 328 may be welded to a corresponding welding pad on the circuit board.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, the use of "including", "comprising", "having", "containing", or "involving", and variations thereof herein, is meant to encompass the items listed thereafter (or equivalents thereof) and/or as additional items.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

The present disclosure has been described through the above embodiments, but it should be understood that the above embodiments are only for the purpose of illustration and description, and are not intended to limit the present disclosure to the scope of the described embodiments. In addition, it may be understood by a person skilled in the art that the present disclosure is not limited to the above embodiments, a variety of variations and modifications may be made according to the teaching of the present disclosure, and these variations and modifications all fall within the scope of protection of the present disclosure. The scope of protection of the present disclosure is defined by the appended claims and its equivalent scope.

What is claimed is:

1. An electrical connector, comprising:
a housing having a slot and a plurality of openings on two sides of the slot; and
a plurality of contacts held in the plurality of openings, each of the plurality of contacts comprising a plurality of members, wherein:
each member comprises only one contact portion curving into the slot, and
for each contact of the plurality of contacts, the contact portions of the plurality of members are arranged along an inserting direction, a first member of the plurality of members of the contact comprises a protrusion and a second member of the plurality of members of the contact comprises a groove configured to receive the protrusion of the first member.

2. The electrical connector according to claim 1, wherein:
an end of each member away from a mouth of the slot is fixed in the opening, and
the contact portion of each member is arranged at an end of the member close to the mouth of the slot.

3. The electrical connector according to claim 1, wherein:
the housing has an interfacing surface and a mounting surface which are opposite to each other along the inserting direction,
the slot extends through the interfacing surface into the housing and elongates along a longitudinal direction,
each of the openings comprises a first sub-opening and a second sub-opening coupled to each other,
the first sub-opening extends from the mounting surface to an inner side wall of the slot and is coupled to the slot,
the second sub-opening is located on an outer side of the first sub-opening relative to the slot,
a longitudinal dimension of the second sub-opening is greater than a longitudinal dimension of the first sub-opening, and
the second sub-opening extends from the mounting surface into the housing.

4. The electrical connector according to claim 3, wherein:
for each contact, each of the plurality of members comprises a body and an arm, and
for each of the plurality of members:
the body is closer to the mounting surface than the arm,
the contact portion is located on the arm, and
a longitudinal dimension of the body is greater than a longitudinal dimension of the arm.

5. The electrical connector according to claim 4, wherein, for each of the plurality of members:
the body of at least one of the plurality of members of each contact has an elastic lug, wherein the elastic lug protrudes from the body along a direction perpendicular to the inserting direction and abuts against an inner side wall of the second sub-opening or an adjacent member.

6. The electrical connector according to claim 4, wherein the arms of the plurality of members of each contact are accommodated in the first sub-opening.

7. The electrical connector according to claim 3, wherein the first sub-opening is communicated with the second sub-opening through a trapezoidal opening along the inserting direction, and the trapezoidal opening is gradually increased along the inserting direction.

8. The electrical connector according to claim 3, wherein:
each of the openings further comprises a third sub-opening,
the third sub-opening is communicated with the first sub-opening,
the third sub-opening is located on the outer side of the first sub-opening relative to the slot,
the third sub-opening is closer to the interfacing surface than the second sub-opening, and
a longitudinal dimension of the third sub-opening is greater than the longitudinal dimension of the first sub-opening.

9. The electrical connector according to claim 8, wherein the first sub-opening and the third sub-opening extend to the interfacing surface.

10. The electrical connector according to claim 1, wherein:
the plurality of members of each contact is arranged along the inserting direction;
the closer to a mouth of the slot a member is, the closer to an outer side relative to the slot in a transverse direction the member is; and
the transverse direction is perpendicular to the inserting direction and perpendicular to a longitudinal direction in which the slot extends.

11. The electrical connector according to claim 1, wherein only one of the plurality of members of each contact has a mounting portion extending out of the housing.

12. An electrical connector, comprising:
a housing comprising a slot; and
contacts arranged in the housing, wherein:
each contact comprises a first member and a second member,
each of the first member and the second member is beam-shaped,
one of the first member or the second member comprises a protrusion and the other of the first member or the second member comprises a groove, the first member is engaged with the second member through engagement of the protrusion and the groove, and the first member has a first contact portion, the second member has a second contact portion, and the first contact portion and the second contact portion are arranged along an inserting direction.

13. The electrical connector according to claim 12, wherein the groove is formed in the first member and extends along the inserting direction to an end surface of the first member away from the slot, and the protrusion is arranged on the second member and inserted into the groove.

14. The electrical connector according to claim 13, wherein a U-shaped cut is formed in the second member, and a portion surrounded by the U-shaped cut is pushed out to form the protrusion.

15. The electrical connector according to claim 12, wherein:

the first member further comprises a first body and a first arm, the first body has a first end and a second end which are opposite to each other, and the first end is closer to a mouth of the slot than the second end; and the first arm has an inverted J shape, a long end portion of the first arm is connected to the first end of the first body, the first contact portion is arranged at a short end portion of the first arm, and the first arm is located on an inner side of the first body relative to the slot.

16. The electrical connector according to claim 15, wherein:

the second member is located on an inner side of the first member relative to the slot and comprises a second body and a second arm, the protrusion is arranged on the second body, the second body is engaged with the first body through the protrusion, the second body has a third end and a fourth end which are opposite to each other, and the third end is closer to the mouth of the slot than the fourth end; and the second arm has a V shape with an opening towards an outer side of the slot, so that an corner point of the V shape faces the slot, one end of the second arm is connected to the third end of the second body, the second contact portion is located at the corner point, and the second arm is located on an inner side of the second body relative to the slot.

17. The electrical connector according to claim 16, wherein the second member further comprises a connecting arm, the connecting arm has a V shape with an opening towards the outer side of the slot, and the second arm is connected to the third end of the second body through the connecting arm.

18. The electrical connector according to claim 17, wherein the connecting arm is located on an outer side of the second arm and the inner side of the second body relative to the slot.

19. The electrical connector according to claim 16, wherein the housing further has openings, the openings are on two sides of the slot, and the first body and the second body of each contact are press-fitted into the same opening.

20. The electrical connector according to claim 19, wherein an elastic lug is arranged on the second body, the elastic lug and the protrusion protrude toward opposite directions, and the elastic lug abuts against an inner side wall of the opening.

21. The electrical connector according to claim 20, wherein the elastic lug is formed by forming a cut in the second body and pushing out a portion surrounded by the cut.

22. The electrical connector according to claim 16, wherein:

the second member further comprises a mounting portion, the mounting portion extends along a transverse direction from the fourth end of the second body and is located outside the housing, and the transverse direction is perpendicular to the inserting direction and perpendicular to an extending direction of the slot.

23. A method for manufacturing an electrical connector, comprising:

inserting a first contact member in each of a plurality of openings of a housing; and subsequently, inserting a second contact member into each of the plurality of openings so as to electrically and mechanically connect the first contact member and the second contact member, wherein:

one of the first contact member or the second contact member comprises a protrusion and the other of the first contact member or the second contact member comprises a groove, and the first contact member and the second contact member are electrically and mechanically connected with each other through engagement of the protrusion and the groove.

24. An electrical connector, comprising:

a housing having a slot and a plurality of openings on opposite sides of the slot; and a plurality of contacts held in the plurality of openings, each of the plurality of contacts comprising a plurality of members, wherein:

each member comprises a contact portion curving into the slot;

for each contact of the plurality of contacts, only one of the plurality of members comprises a mounting portion extending out of the housing; and each contact of the plurality of contacts comprises a first member comprising a protrusion and a second member comprising a groove configured to receive the protrusion of the first member.

25. The electrical connector of claim 24, wherein:

the first member comprises the mounting portion and a body joining the mounting portion, and the body comprises the protrusion protruding away from the slot.

26. The electrical connector of claim 24, wherein, for each contact:

each of the first member and the second member comprises only one contact portion curving into the slot.

* * * * *